(12) United States Patent
Kroon et al.

(10) Patent No.: US 11,149,697 B2
(45) Date of Patent: Oct. 19, 2021

(54) VEHICLE EXHAUST GAS RECIRCULATION SYSTEM UTILIZING AN INTAKE AIR PRE-HEATER

(71) Applicant: Volvo Car Corporation, Gothenburg (SE)

(72) Inventors: Peter Kroon, Gothenburg (SE); Anders Petrén, Marstrand (SE)

(73) Assignee: Volvo Car Corporation, Gothenburg (SE)

( * ) Notice: Subject to any disclaimer, the term of this patent is extended or adjusted under 35 U.S.C. 154(b) by 16 days.

(21) Appl. No.: 16/261,651

(22) Filed: Jan. 30, 2019

(65) Prior Publication Data

US 2020/0240370 A1 Jul. 30, 2020

(51) Int. Cl.
*F02M 26/33* (2016.01)
*F02B 37/02* (2006.01)
*F02M 26/50* (2016.01)
*F02M 26/17* (2016.01)
*F02M 26/05* (2016.01)

(52) U.S. Cl.
CPC .............. *F02M 26/33* (2016.02); *F02B 37/02* (2013.01); *F02M 26/05* (2016.02); *F02M 26/17* (2016.02); *F02M 26/50* (2016.02); *Y02T 10/12* (2013.01)

(58) Field of Classification Search
CPC ........... F02M 35/042; F02M 35/10242; F02M 35/10248; F02M 26/22–33; F02B 33/443; F02B 37/00–24; Y02T 10/144
See application file for complete search history.

(56) References Cited

U.S. PATENT DOCUMENTS

| 4,020,815 A | 5/1977 | Hubert |
| 4,754,742 A | 7/1988 | Young |
| 4,944,260 A | 7/1990 | Shea et al. |
| 5,740,786 A * | 4/1998 | Gartner ................... F02B 25/06 123/556 |
| 6,029,363 A | 2/2000 | Kiel |

(Continued)

FOREIGN PATENT DOCUMENTS

| DE | 102004013206 A1 * | 10/2005 | ........... F02M 31/083 |
| FR | 2797660 B1 * | 8/2002 | .......... F02B 29/0475 |

(Continued)

*Primary Examiner* — Laert Dounis
(74) *Attorney, Agent, or Firm* — Clements Bernard Walker; Christopher L. Bernard (57) ABSTRACT

An exhaust gas recirculation (EGR) system utilizes an intake air pre-heater to selectively heat the cool, dry intake air prior to the mixing point with the hot, humid EGR gases. This intake air pre-heater utilizes available heat from a high pressure (HP) EGR heat exchanger, circulating a cooling/heating fluid between the HP EGR heat exchanger and the intake air pre-heater. The intake air pre-heater is disposed in an intake air filter box, optionally on the dirty side of the air filter, and includes a heat exchanger conduit that is contacted with the intake air. The selective operation of the intake air pre-heater is controlled via an electronic control module (ECM) of the vehicle, based on the operating conditions of the vehicle and an appropriate temperature control model. Flow of the cooling/heating fluid is selectively enabled/disabled by a pump and/or valve assembly disposed along the associated high temperature (HT) cooling/heating circuit.

20 Claims, 5 Drawing Sheets

(56) References Cited

U.S. PATENT DOCUMENTS

| | | | |
|---|---|---|---|
| 7,284,508 | B2 | 10/2007 | Dopke et al. |
| 7,475,657 | B2 | 1/2009 | Dopke et al. |
| 7,757,674 | B2 | 7/2010 | Dopke et al. |
| 7,963,832 | B2 | 7/2011 | Bellinger |
| 8,042,326 | B2 | 10/2011 | Farell et al. |
| 9,499,043 | B2 | 11/2016 | Zocher et al. |
| 9,850,858 | B2 | 12/2017 | Mouton et al. |
| 2008/0190109 | A1* | 8/2008 | Kardos ............... F02B 29/0412 60/605.2 |
| 2016/0169081 | A1* | 6/2016 | Hosokawa ................ F01P 7/16 123/41.08 |
| 2019/0323457 | A1* | 10/2019 | Rohrssen ............... F02M 26/05 |
| 2020/0141366 | A1* | 5/2020 | Quix ...................... F02M 26/06 |
| 2020/0340431 | A1* | 10/2020 | Kindl ..................... F02M 31/13 |
| 2020/0355142 | A1* | 11/2020 | Kuske ................ F02B 29/0437 |
| 2020/0355143 | A1* | 11/2020 | Kuske ................... F02M 26/28 |

FOREIGN PATENT DOCUMENTS

| | | | | |
|---|---|---|---|---|
| GB | 2535996 | A | * 9/2016 | ............ F02M 26/06 |
| JP | 08082256 | A | * 3/1996 | .......... F02B 29/0406 |

\* cited by examiner

VEHICLE EXHAUST GAS RECIRCULATION SYSTEM UTILIZING AN INTAKE AIR PRE-HEATER

TECHNICAL FIELD

The present invention relates generally to the automotive field. More specifically, the present invention relates to a vehicle exhaust gas recirculation (EGR) system utilizing an intake air pre-heater to selectively avoid condensation in the exhaust gases recirculated to the associated turbocharger compressor inlet, thereby avoiding subsequent compressor component damage.

BACKGROUND ART

As fuel efficiency and emissions concerns become increasingly important, more and more vehicles are being equipped with turbochargers utilizing exhaust gas recirculation (EGR) systems. EGR systems increase the fuel efficiency of an internal combustion (IC) engine and reduce the emissions of noxious exhaust gases by recirculating a portion of the unused fuel and exhaust gases back to the engine for subsequent use, instead of releasing them into the environment. In a low pressure (LP) EGR system, the exhaust gases are reintroduced to the engine just upstream of the turbocharger compressor, at the turbocharger compressor inlet. At this location, the pressure is low, even under high engine boost conditions. This solves some of the quality issues associated with related high pressure (HP) EGR systems.

Figure 1:
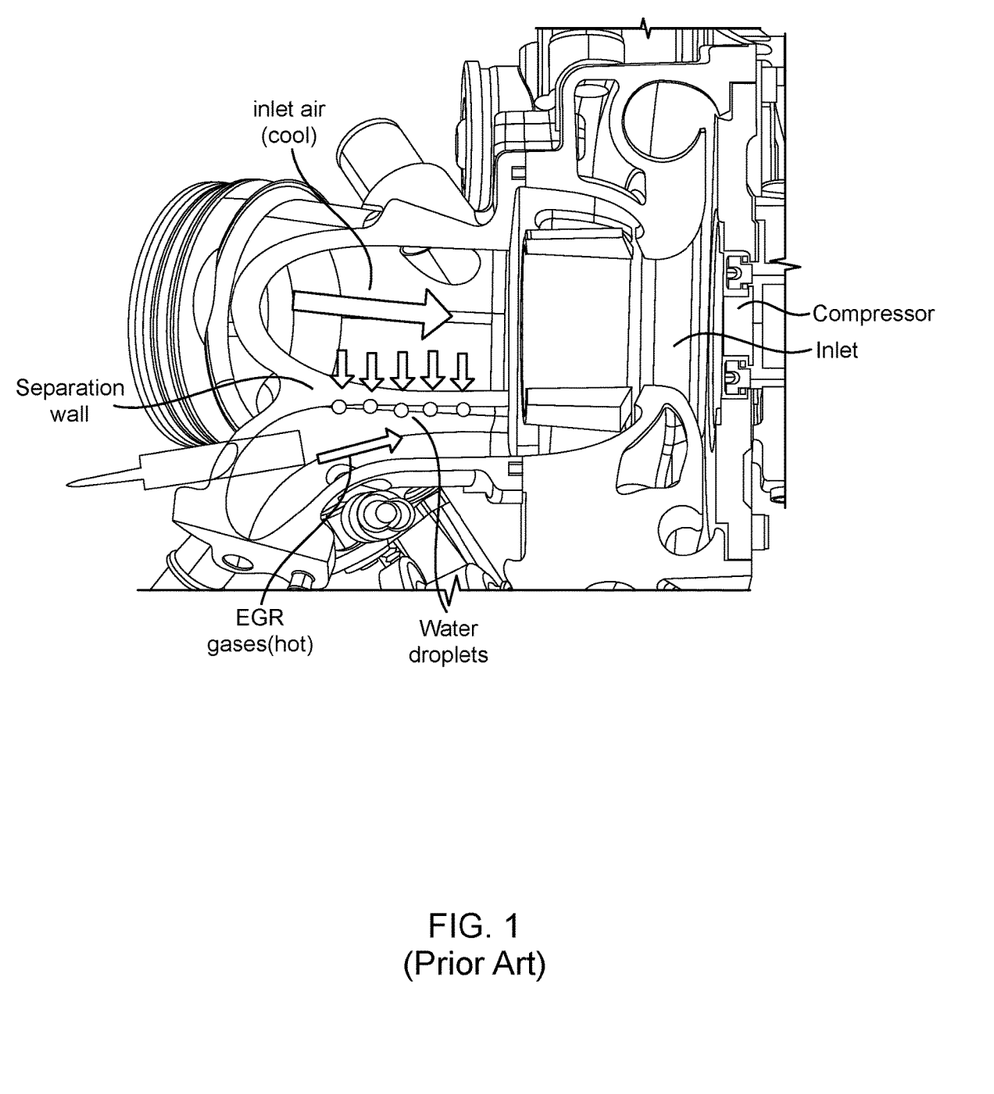
FIG. 1 is a cut-away perspective view of a conventional ported shroud and compressor inlet area of an EGR system, highlighting the problematic condensation of water droplets near the mixing point of the associated EGR gases and intake air.

As illustrated in FIG. 1, EGR gases are mixed with conventional intake air just before entering the turbocharger compressor. The ratio of EGR gases to intake air determines the efficiency of the EGR system and engine overall. The utilization of EGR gases, however, is often limited by the condensation of water droplets in the EGR gases near the mixing point as the hot, humid EGR gases are cooled by the cool, dry intake air. This cooling usually occurs through (and condensation usually occurs on and adjacent to) the wall that divides the hot, humid EGR gases from the cool, dry intake air just prior to the mixing point, in the hot, humid EGR gases. This problem is especially pronounced under cold start and low temperature operating conditions, sometimes delaying the normal activation of the EGR system. This can compromise emissions testing results, for example, and otherwise degrade engine performance. In a worst case scenario, under extreme conditions, ice particles can even be formed in the EGR gases, exacerbating these issues.

Figure 2:
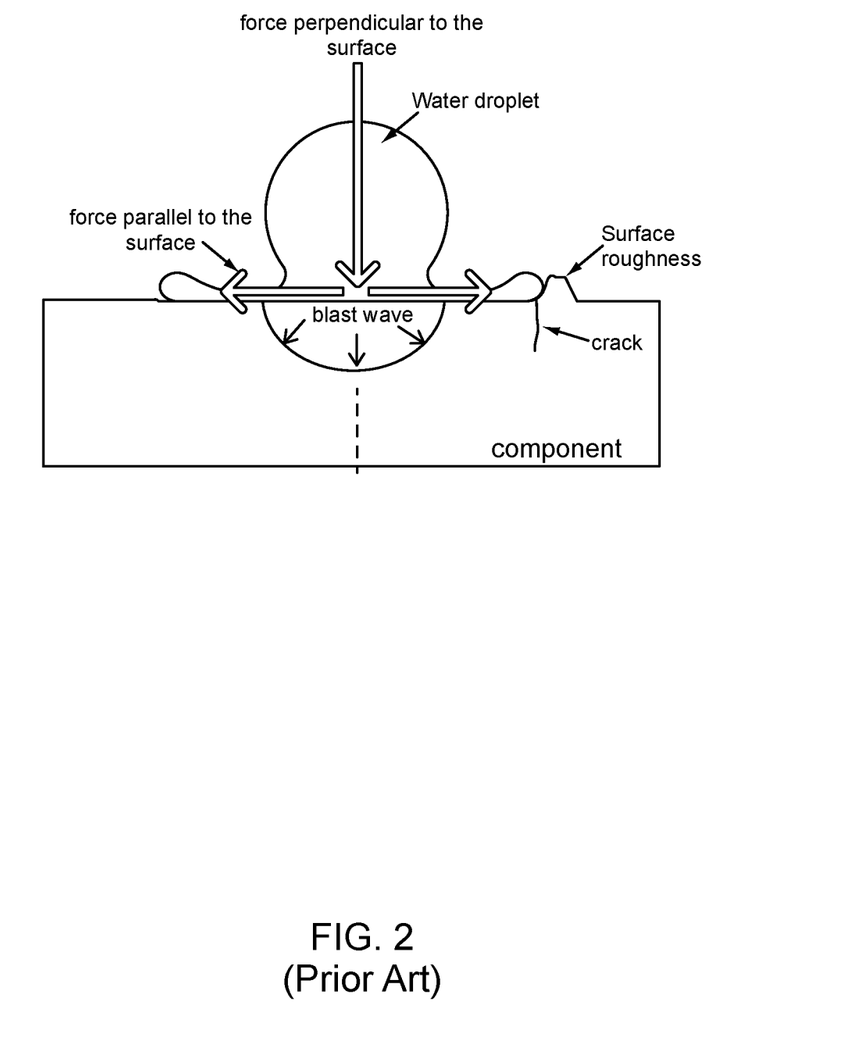
FIG. 2 is a schematic diagram illustrating the mechanism by which condensed water droplets can damage a turbocharger compressor component.

Problematically, the condensed water droplets (or ice particles) near the mixing point of the EGR gases and the intake air are fed directly to the turbocharger compressor. These water droplets (or ice particles) can impact the turbocharger compressor wheel, blades, and other components, damaging them. As illustrated in FIG. 2, the water droplets initially exert a force perpendicular to the component surface, which causes a blast wave upon component surface contact, resulting in a force exerted parallel to the component surface. This force exerted parallel to the component surface can impinge upon surface imperfections, causing spalls, cracks, etc. at or near such surface imperfections.

Thus, what is still needed in the art is an EGR system that inhibits the condensation of water droplets and the formation of ice particles near the mixing point of the associated EGR gases and intake air, and especially on and adjacent to the wall separating the EGR gases from the intake air, such that the subsequent turbocharger compressor wheel, blades, and other components are not damaged by the condensed water droplets or formed ice particles.

SUMMARY

Accordingly, the exhaust gas recirculation (EGR) system provided herein utilizes an intake air pre-heater to selectively heat the cool, dry intake air prior to the mixing point with the hot, humid EGR gases. This intake air pre-heater utilizes available heat from the conventional high pressure (HP) EGR heat exchanger, circulating a cooling/heating fluid between the HP EGR heat exchanger and the intake air pre-heater. The intake air pre-heater is disposed in the conventional intake air filter box, optionally on the dirty side of the air filter, and includes a heat exchanger conduit that is contacted with the intake air.

The selective operation of the intake air pre-heater is controlled via an electronic control module (ECM) of the vehicle, based on the operating conditions of the vehicle and an appropriate temperature control model. Flow of the cooling/heating fluid is selectively enabled/disabled by a pump and/or valve assembly disposed along the associated high temperature (HT) cooling/heating circuit.

The intake air pre-heater provided herein effectively inhibits the condensation of water droplets and the formation of ice particles near and at the mixing point of the EGR gases and intake air in the upstream proximity of the compressor inlet, such that the turbocharger compressor wheel, blades, and other components are not subsequently damaged by the condensed water droplets or formed ice particles. Advantageously, this inhibition can be targeted to certain known problematic operating conditions.

In one exemplary embodiment, the vehicle exhaust gas recirculation (EGR) system provided herein includes: a high pressure (HP) EGR heat exchanger thermally coupled between an intake manifold and an exhaust manifold of an engine of a vehicle; means for receiving intake air and providing the intake air to a turbocharger compressor of the vehicle; and means for selectively heating the intake air before the intake air is provided to the turbocharger compressor of the vehicle fluidly coupled to the HP EGR heat exchanger.

In another exemplary embodiment, the intake air pre-heater for the vehicle exhaust gas recirculation (EGR) system provided herein includes: an intake air filter box including a housing defining an intake air inlet port and an intake air outlet port; a heat exchanger section disposed within the housing and thermally coupled to the intake air, the heat exchanger section adapted to carry a heating fluid and selectively heat the intake air; an inlet line fluidly coupled to the heat exchanger section through the housing and thermally coupled to a high pressure (HP) EGR heat exchanger adapted to be thermally coupled between an intake manifold and an exhaust manifold of an engine of a vehicle; and an outlet line fluidly coupled to the heat exchanger section through the housing and thermally coupled to the high pressure (HP) EGR heat exchanger.

In a further exemplary embodiment, the computer program product provided herein includes a non-transitory computer readable medium having instructions stored thereon and executed to cause a computer to: receive an operating state of a vehicle; compare the operating state of the vehicle to an exhaust gas recirculation (EGR) temperature control model; and based on the comparison of the operating state of the vehicle to the EGR temperature control model, selectively enable/disable the heating of intake air between an air intake of the vehicle and a turbocharger compressor of an EGR system of the vehicle.

BRIEF DESCRIPTION OF THE DRAWINGS

The present invention is illustrated and described herein with reference to the various drawings, in which like reference numbers are used to denote like system or assembly components/method or algorithm steps, as appropriate, and in which.

DESCRIPTION OF EMBODIMENTS

Again, the exhaust gas recirculation (EGR) system provided herein utilizes an intake air pre-heater to selectively heat the cool, dry intake air prior to the mixing point with the hot, humid EGR gases. This intake air pre-heater utilizes available heat from the conventional high pressure (HP) EGR heat exchanger, circulating a cooling/heating fluid between the HP EGR heat exchanger and the intake air pre-heater. The intake air pre-heater is disposed in the conventional intake air filter box, optionally on the dirty side of the air filter, and includes a heat exchanger conduit that is contacted with the intake air.

The selective operation of the intake air pre-heater is controlled via an electronic control module (ECM) of the vehicle, based on the operating conditions of the vehicle and an appropriate temperature control model. Flow of the cooling/heating fluid is selectively enabled/disabled by a pump and/or valve assembly disposed along the associated high temperature (HT) cooling/heating circuit.

The intake air pre-heater provided herein effectively inhibits the condensation of water droplets and the formation of ice particles near and at the mixing point of the EGR gases and intake air in the upstream proximity of the compressor inlet, such that the turbocharger compressor wheel, blades, and other components are not subsequently damaged by the condensed water droplets or formed ice particles. Advantageously, this inhibition can be targeted to certain known problematic operating conditions.

Figure 3:
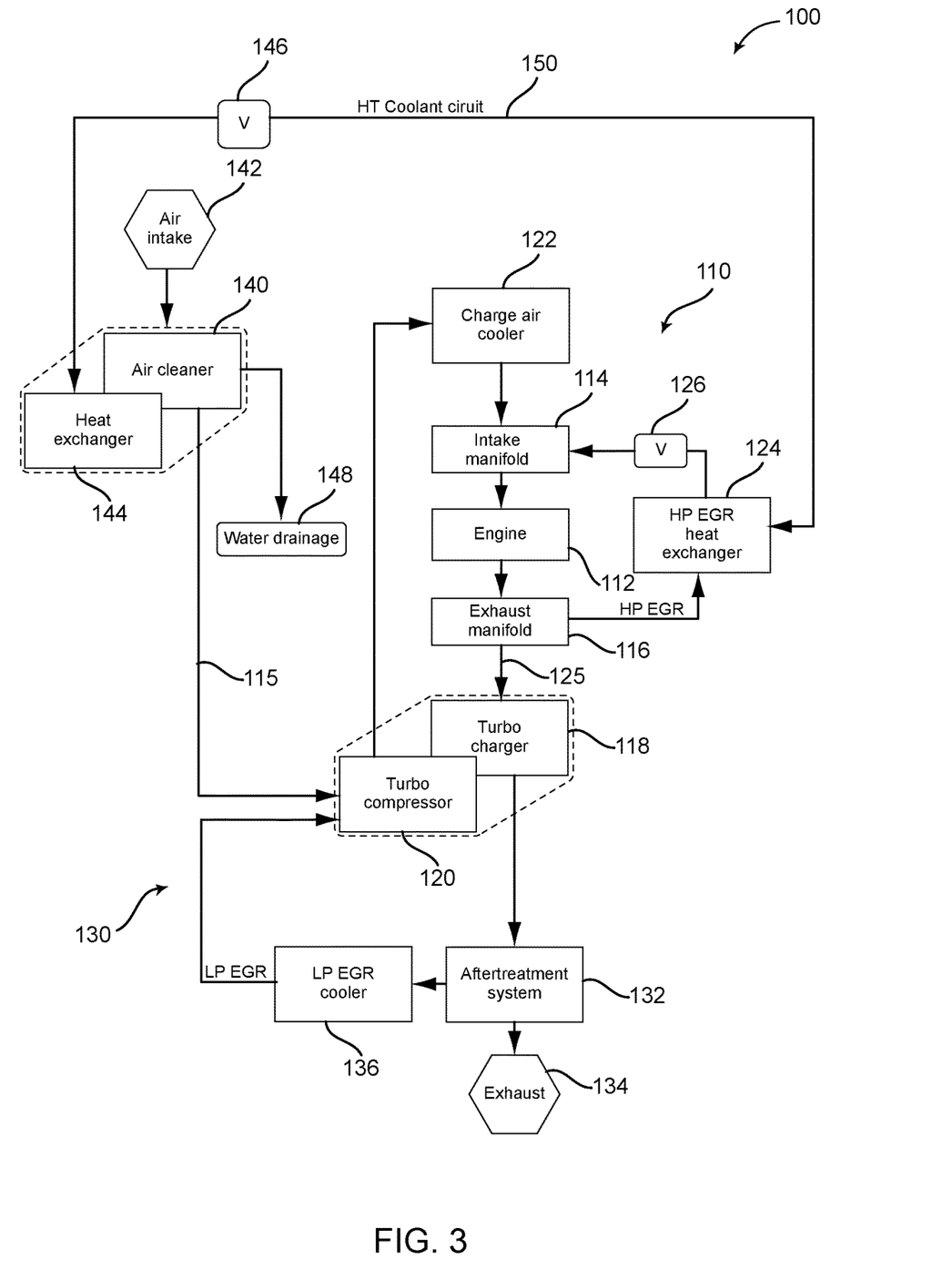
FIG. 3 is a schematic diagram illustrating one exemplary embodiment of the EGR system provided herein, utilizing an intake air pre-heater.

Referring now specifically to FIG. 3, in one exemplary embodiment, the EGR system 100 provided herein includes the following components, most of which are conventional and are thus not described in greater detail herein. The EGR system 100 includes a HP EGR circuit 110 including the engine 112 of the vehicle (not illustrated) incorporating both an intake manifold 114 and an exhaust manifold 116. A turbocharger 118 is coupled to the exhaust manifold 116 and includes an appropriate turbocharger compressor 120 that mixes and compresses the intake air 115 addressed herein and the EGR gases 125 from the exhaust manifold 116. The turbocharger compressor 120 outlets to a charge air cooler 122 that is coupled to the intake manifold 114. The HP EGR circuit 110 is formed by an HP EGR heat exchanger 124 disposed between the exhaust manifold 116 and the intake manifold 114, along with an appropriate pump and/or valve assembly 126 operable for selectively enabling/disabling the flow of fluid through the HP EGR circuit 110.

The EGR system 100 also includes a low pressure (LP) EGR circuit 130 including an after-treatment system 132 coupled to the turbocharger 118 and, ultimately, the vehicle exhaust 134. ALP EGR cooler 136 is coupled between the after-treatment system 132 and the turbocharger compressor 120.

The EGR system 100 further includes an air cleaner 140, or intake air filter box, coupled to an air intake 142 of the vehicle. The intake air filter box 140 is generally configured to provide the cool, dry intake air 115 to the turbocharger compressor 120, proximate to which the cool, dry intake air 115 is mixed with the hot, humid EGR gases 125. As provided herein, the dirty side of the filter (not illustrated) disposed within the intake air filter box 140 includes a heat exchanger 144, or intake air pre-heater, that is fluidly coupled to the HP EGR heat exchanger 124 of the HP EGR circuit 110. This intake air pre-heater 144 is operable for selectively heating the cool, dry intake air 115, thereby limiting condensation proximate the turbocharger compressor 120 when the cool, dry intake air 115 is mixed with the hot, humid EGR gases 125. The operation of the intake air pre-heater 144 is controlled by a pump and/or valve assembly 146 disposed along the HT coolant circuit 148, and ultimately by the vehicle ECM (not illustrated). A water drain 150 or the like is optionally provided in the lower portion of the intake air filter box 140 to selectively remove water/condensation from the intake air filter box 140.

Again, the intake air pre-heater 144 effectively inhibits the condensation of water droplets and the formation of ice particles near and at the mixing point of the EGR gases 125 and intake air in the upstream proximity of the compressor inlet, such that the turbocharger compressor wheel, blades, and other components are not subsequently damaged by the condensed water droplets or formed ice particles. Advantageously, this inhibition can be targeted to certain known problematic operating conditions.

Figure 4:
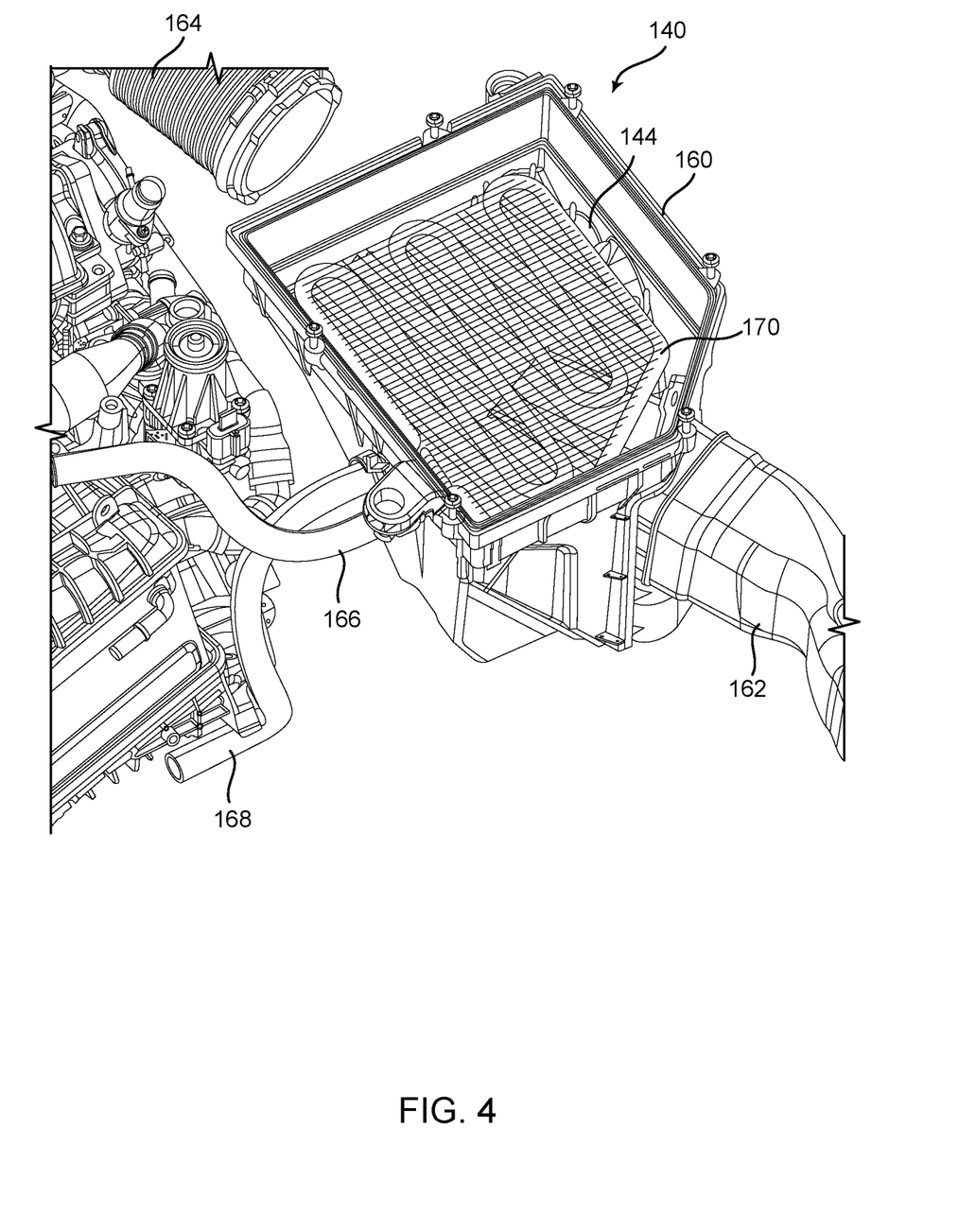
FIG. 4 is a perspective view of one exemplary embodiment of the intake air filter box provided herein and used in the EGR system of FIG. 3, with the intake air filter box being in an open configuration.

Referring now specifically to FIG. 4, in one exemplary embodiment, the intake air filter box 140 includes a filter housing 160 utilizing an inlet port/line 162 from the air intake 142 (FIG. 3) and an outlet port/line 164 to the turbocharger compressor 120, via which intake air 115 (FIG. 3) is communicated from the air intake 142 to the turbocharger compressor 120. The intake air pre-heater 144 is disposed within the filter housing 160, on the dirty side of the filter (not illustrated) disposed therein. The intake air pre-heater 144 includes an inlet line 166 from the HP EGR heat exchanger 124 (FIG. 3), an outlet line 168 to the HP EGR heat exchanger 124, and a heat exchanger section 170 disposed therebetween. In this exemplary embodiment, the heat exchanger section 170 includes a plurality of parallel conduit sections that effectively increase the heat transfer area of the heat exchanger section 170. The inlet line 166, outlet line 168, and heat exchanger section 170 collectively carry heating/cooling fluid between the intake air pre-heater 144 and the HP EGR heat exchanger 124.

Figure 5:
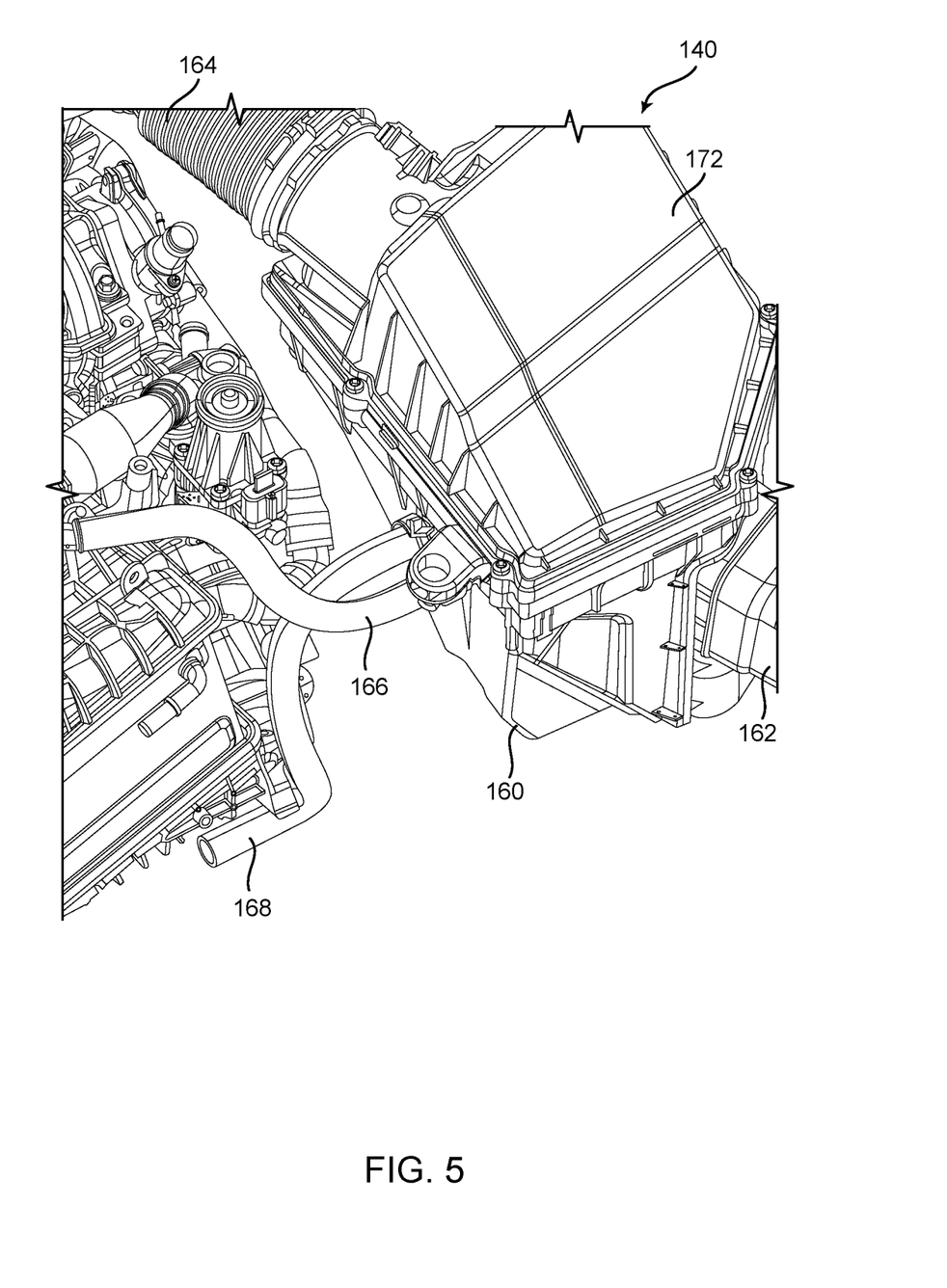
FIG. 5 is another perspective view of one exemplary embodiment of the intake air filter box provided herein and used in the EGR system of FIG. 3, with the intake air filter box being in a closed configuration.

FIG. 5 is a perspective view of the intake air filter box 140 provided herein and used in the EGR system 100 of FIG. 3, with the intake air filter box 140 being in a closed configuration via the use of a housing cover 172 coupled to the housing 160 with the air filter (not illustrated) disposed therein. The inlet line 166 and outlet line 168 protrude through a side portion of the housing 160. Preferably, the housing 160 and housing cover 172 at least partially insulate the heat exchanger section 170 (FIG. 4) of the intake air pre-heater 144 (FIGS. 3 and 4).

The software algorithm contemplated herein determines the current and desired operating state of the associated vehicle and enables/disables the operation of the intake air pre-heater as appropriate, in accordance with the description herein. Preferably, the software algorithm is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a GUI that enables a user to interact with the memory. Additionally, the I/O interfaces may further include an imaging device, i.e. camera, video camera, sensors, etc., as described herein.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Again, the intake air pre-heater and methodologies provided herein effectively inhibit the condensation of water droplets and the formation of ice particles near and at the mixing point of the EGR gases and intake air in the upstream proximity of the compressor inlet, such that the turbocharger compressor wheel, blades, and other components are not subsequently damaged by the condensed water droplets or formed ice particles. Advantageously, this inhibition can be targeted to certain known problematic operating conditions.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

The invention claimed is:

1. A vehicle exhaust gas recirculation (EGR) system, comprising:
   a high pressure (HP) EGR heat exchanger thermally coupled between an intake manifold and an exhaust manifold of an engine of a vehicle;
   an intake air filter box adapted to receive intake air and provide the intake air to a turbocharger compressor of the vehicle; and
   an intake air pre-heater disposed within the intake air filter box adapted to heat the intake air before the intake air is provided to the turbocharger compressor of the vehicle;
   wherein the intake air pre-heater is fluidly coupled to the HP EGR heat exchanger via a high temperature coolant circuit adapted to circulate a heating fluid thermally coupled to both the intake air of the intake air filter box and exhaust gas of the HP EGR heat exchanger, wherein a flow of the heating fluid is selectively enabled/disabled in the high temperature coolant circuit and a flow of the exhaust gas is selectively enabled/disabled through the HP EGR heat exchanger, and wherein the high temperature coolant circuit also removes heat from the exhaust gas.

2. The vehicle EGR system of claim 1, wherein the intake air pre-heater comprises a heat exchanger conduit section disposed within the intake air filter box and thermally coupled to the intake air.

3. The vehicle EGR system of claim 1, wherein the intake air pre-heater is adapted to be disposed on a dirty side of a filter disposed within the intake air filter box.

4. The vehicle EGR system of claim 1, further comprising one or more of a pump assembly and a valve assembly fluidly coupled to the intake air pre-heater in the high temperature coolant circuit and adapted to selectively enable/disable the heating fluid flow between the HP EGR heat exchanger and the intake air pre-heater.

5. The vehicle EGR system of claim 1, further comprising an electronic control module (ECM) executing an algorithm operable for selectively enabling/disabling the heating fluid flow between the HP EGR heat exchanger and the intake air pre-heater.

6. The vehicle EGR system of claim 1, wherein the intake air heated by the intake air pre-heater disposed within the intake air filter box using heat derived from the HP EGR heat exchanger is mixed with hot, humid gas from a low pressure (LP) EGR system prior to being provided the turbocharger compressor of the vehicle.

7. The vehicle EGR system of claim 1, wherein the HP EGR heat exchanger forms part of a HP EGR circuit comprising a valve disposed between the HP EGR heat exchanger and the intake manifold that selectively enables exhaust flow from the exhaust manifold to the intake manifold.

8. An intake air pre-heater for a vehicle exhaust gas recirculation (EGR) system, the intake air pre-heater comprising:
- an intake air filter box comprising a housing defining an intake air inlet port and an intake air outlet port;
- a heat exchanger section disposed within the housing and thermally coupled to the intake air, the heat exchanger section adapted to carry a heating fluid and selectively heat the intake air;
- an inlet line fluidly coupled to the heat exchanger section through the housing and thermally coupled to a high pressure (HP) EGR heat exchanger adapted to be thermally coupled between an intake manifold and an exhaust manifold of an engine of a vehicle; and
- an outlet line fluidly coupled to the heat exchanger section through the housing and thermally coupled to the high pressure (HP) EGR heat exchanger;
- wherein the heat exchanger section is fluidly coupled to the HP EGR heat exchanger via a high temperature coolant circuit adapted to circulate the heating fluid thermally coupled to both the intake air of the intake air filter box and exhaust gas of the HP EGR heat exchanger, wherein a flow of the heating fluid is selectively enabled/disabled in the high temperature coolant circuit and a flow of the exhaust gas is selectively enabled/disabled through the HP EGR heat exchanger, and wherein the HP EGR heat exchanger also removes heat from the exhaust gas.

9. The intake air preheater of claim 8, wherein the intake air inlet port is adapted to receive the intake air and the intake air outlet port is adapted to provide the intake air to the turbocharger compressor of the vehicle.

10. The intake air preheater of claim 8, wherein the heat exchanger section comprises a plurality of connected parallel fluid conduits disposed within the housing.

11. The intake air preheater of claim 8, wherein the heat exchanger section is adapted to be disposed on a dirty side of a filter disposed within the housing.

12. The intake air preheater of claim 8, further comprising one or more of a pump assembly and a valve assembly fluidly coupled to one or more of the inlet line and the outlet line and adapted to selectively enable/disable the heating fluid flow of the high temperature coolant circuit between the HP EGR heat exchanger and the heat exchanger section.

13. The intake air preheater of claim 8, wherein the intake air heated by the heat exchanger section disposed within the intake air filter box using heat derived from the HP EGR heat exchanger is mixed with hot, humid gas from a low pressure (LP) EGR system prior to being provided the turbocharger compressor of the vehicle.

14. The intake air preheater of claim 8, further comprising an electronic control module (ECM) executing an algorithm operable for selectively enabling/disabling the heating fluid flow between the HP EGR heat exchanger and the heat exchanger section.

15. The intake air preheater of claim 8, wherein the HP EGR heat exchanger forms part of a HP EGR circuit comprising a valve disposed between the HP EGR heat exchanger and the intake manifold that selectively enables exhaust flow from the exhaust manifold to the intake manifold.

16. A computer program product comprising a non-transitory computer readable medium having instructions stored thereon and executed to cause a computer to:
- receive an operating state of a vehicle;
- compare the operating state of the vehicle to an exhaust gas recirculation (EGR) temperature control model; and
- based on the comparison of the operating state of the vehicle to the EGR temperature control model, selectively enable/disable the heating of intake air between an air intake of the vehicle and a turbocharger compressor of an EGR system of the vehicle;
- wherein the intake air is communicated from the air intake and the turbocharger compressor via an intake air filter box including an intake air inlet port and an intake air outlet port;
- wherein selectively enabling/disabling the heating of the intake air comprises selectively enabling/disabling a heating fluid flow through an intake air pre-heater disposed within the intake air filter box; and
- wherein selectively enabling/disabling the heating fluid flow through the intake air pre-heater disposed within the intake air filter box comprises selectively enabling/disabling one or more of a pump assembly and a valve assembly fluidly coupled between the intake air pre-heater and a high pressure (HP) EGR heat exchanger of the EGR system thermally coupled between an intake manifold and an exhaust manifold of an engine of the vehicle, wherein the one or more of the pump assembly and the valve assembly form part of a high temperature coolant circuit adapted to carry the heating fluid flow between exhaust of the HP EGR heat exchanger and the intake air of the air intake, wherein the heating fluid flow is selectively enabled/disabled in the high temperature coolant circuit and a flow of the exhaust gas is selectively enabled/disabled through the HP EGR heat exchanger, and wherein the high temperature coolant circuit also removes heat from the exhaust gas.

17. The computer program product of claim 16, where the intake air pre-heater includes a heat exchanger conduit section disposed within the intake air filter box and thermally coupled to the intake air.

18. The computer program product of claim 16, wherein the computer comprises an electronic control module (ECM) of the vehicle.

19. The computer program product of claim 16, wherein the intake air heated by the intake air pre-heater disposed within the intake air filter box using heat derived from the HP EGR heat exchanger is mixed with hot, humid gas from a low pressure (LP) EGR system prior to being provided the turbocharger compressor of the vehicle.

20. The computer program product of claim 16, wherein the HP EGR heat exchanger forms part of a HP EGR circuit comprising a valve disposed between the HP EGR heat exchanger and the intake manifold that selectively enables exhaust flow from the exhaust manifold to the intake manifold.

* * * * *